UNITED STATES PATENT OFFICE.

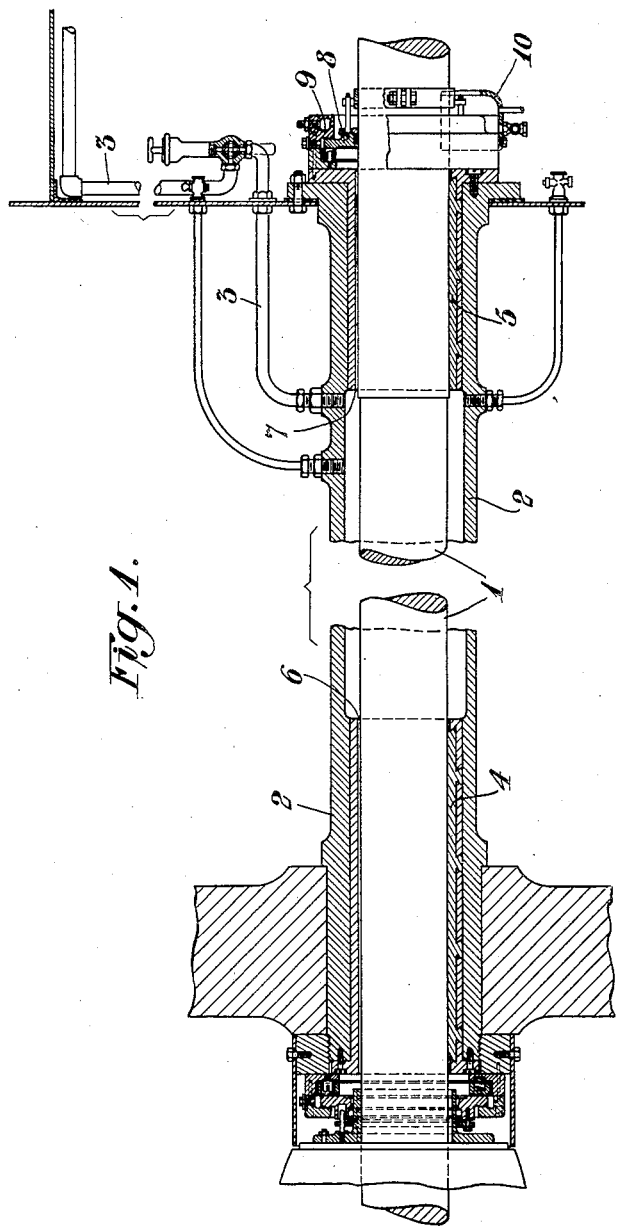

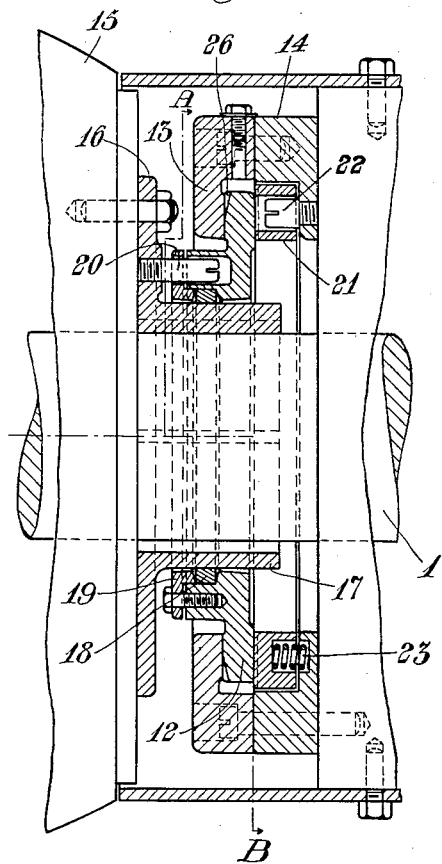
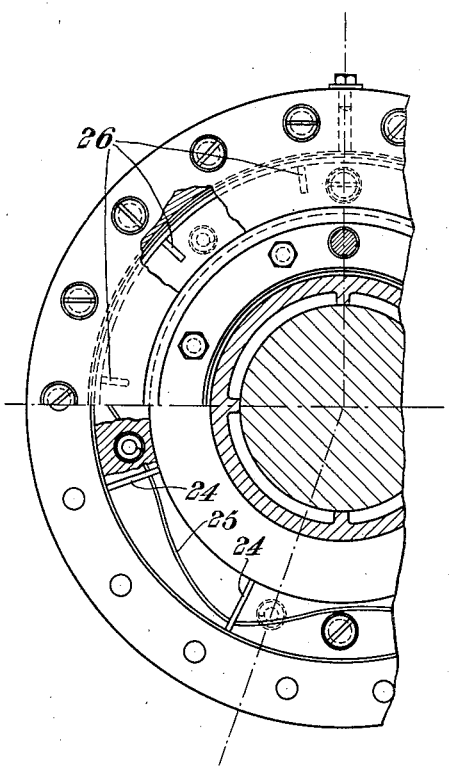
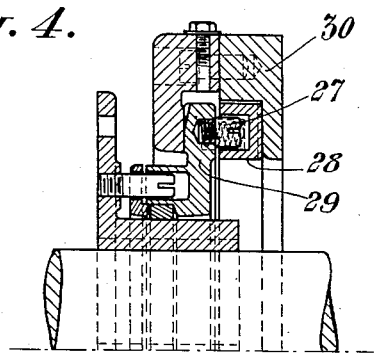

CARL WILHELM CEDERVALL, OF GOTTENBORG, SWEDEN.

STUFFING-BOX FOR PROPELLER-SHAFTS.

1,399,421.	Specification of Letters Patent.	Patented Dec. 6, 1921.

Application filed July 19, 1917. Serial No. 181,490.

*To all whom it may concern:*

Be it known that I, CARL WILHELM CEDERVALL, a subject of the King of Sweden, residing at Gottenburg, in the Kingdom of Sweden, have invented a new and useful Improvement in Stuffing-Boxes for Propeller-Shafts, of which the following is a specification.

Stuffing-boxes for propeller shafts are previously known which are provided with a member rotating with the shaft, which member is provided with one or several disk-like flanges entering in between corresponding flanges on a stationary member surrounding the shaft, the member rotating with the shaft being able to slide on the same, for the purpose of its flanges becoming pressed against the flanges of the stationary member on account of difference in pressure outside and inside the stuffing-box, and thus establishing tightness. On account of this member rotating with the shaft being able to slide on the shaft, that is to say, being movable in the longitudinal direction of the shaft, however, it is necessary to provide a packing between the member and the shaft in order to obtain tightness between the same, and it has been found that in order to obtain perfect tightness the packing must press so hard against the shaft that particularly after the packing has become drenched with oil and water, when in use, the resultant friction between the member and the shaft becomes too great to be overcome by the pressure on either side of the member. When for instance owing to the shaft becoming extended through generation of heat during operation, the sliding member has been moved some distance on the shaft on account of its flanges pressing against the surrounding flanges of the stationary member, the sliding member will follow the shaft, when later it contracts, and will be drawn from the flanges of the stationary member, when the tightness will be lost and the oil in the stuffing-box and in the bearings inside the same will flow out, whereupon the water may flow into these parts and corrode the same and the shaft. Even when every flange rotating with the shaft is arranged between two stationary flanges, it is not possible to avoid this disadvantage, as from reasons of manufacture there must always be provided some play between the flanges and as this play will become increased owing to wear during operation, it may happen that the flange on the shaft will stop in an intermediate position between the two stationary flanges, when the shaft retracts, and that in consequence the tightness between the flanges will be lost.

This invention relates to an arrangement for overcoming in stuffing-boxes of this kind the friction caused by the said packing between the sliding member and the shaft and for holding the flanges of this member securely pressed against the flanges of the stationary member. The arrangement is broadly characterized by this that on the side of the flange rotating with the shaft, opposite the stationary flange, a ring or a disk is provided which is pressed against the rotary flange, or against a stationary member or flange, by springs or the like inserted between the said ring and a stationary member, or between the ring and the rotary flange.

The invention is illustrated in the accompanying drawings in which Figure 1 shows a vertical longitudinal section of a stern-tube provided with an improved stuffing-box according to my present invention. Fig. 2 shows an axial section of the stuffing-box, while Fig. 3 shows a cross section on the line A—B in Fig. 2. Fig. 4 shows a section of a second embodiment.

Referring to Fig. 1 which illustrates the general arrangement of a stern-tube in which the propeller shaft in running in oil under pressure, 1 denotes the shaft, and 2 the stern-tube, to which the oil is applied through the pipe 3. The oil is admitted to the bearings 4 and 5 through oil grooves 6 and 7 in the same. At the inside or forward end of the stern-tube 2 the escape of oil is prevented by means of a stuffing-box, which consists, principally, of a flange 8 rotating with the shaft and pressed by the oil against a stationary flange 9, while any escaping oil will be collected in the shield 10. This stuffing-box is arranged according to the present invention. At the rear or outside end the stern-tube is also provided with a stuffing-box according to the present invention, an embodiment of which is shown to a larger scale in Figs. 2 and 3.

This embodiment is provided with a single flange 12 rotating with the shaft 1, which flange is to be kept pressed against the stationary flange 13 by the oil under pressure around the propeller shaft in the stern-tube. This stationary flange 13 is bolted to a ring 14 which in turn is secured in suitable manner to the stern or to the stern-tube. 15 denotes the propeller hub to which the flange 16 of the sleeve 17 surrounding and protecting the shaft, is secured. The flange 12 slides forward and backward on this sleeve and is tightened against the same by means of the packing 18 retained between the flange and a ring 19 bolted to the same. The flange 12 is caused to rotate with the shaft 1 by means of a suitable number of studs 20 secured to the flange 16 of the sleeve 17, which studs enter into holes in the flange 12, so that this flange may slide forward and backward on the sleeve 17.

On the side of the rotary flange 12 opposite the flange 13 there is a ring 21 bearing against the same, which ring is prevented from rotation by a number of studs 22, but may move in the longitudinal direction of the shaft on said studs, which are secured to the ring 14 and project into holes in the ring 21. Between the rings 21 and 14, springs 23 pressing the ring 21 against the flange 12, are provided in a number of recesses in the ring. These springs are together strong enough to overcome the friction caused by the packing 18 between the flange 12 and the sleeve 17, and they are preferably of such strength that they may overcome said friction and the pressure of the water outside the flange 12, even if by any chance the pressure of the oil on the inside of the flange 12 ceases. In order to reduce the friction between the flange 12 and the ring 21 this latter is provided with radial flutes 24 and oil-grooves 25 between these flutes, and for lubrication between the rotary flange 12 and the stationary flange 13 either of these members, for instance the flange 12, is provided with short flutes 26 communicating with the inner side of the flange.

It will be understood that the arrangement described permits the oil pressure to act on the entire inner surface of the flange 12, as the oil pressure acts on the surface of the ring 21 directed toward the ring 14.

It is evident from the description and the drawing that the arrangement is exceedingly easy to manufacture and does not take up any extra space.

Instead of springs any other resilient arrangement may be used.

Instead of being attached to the non-rotating ring 14 the ring 21 might also constitute a part of the rotary flange 12. This is illustrated in Fig. 4 where the springs 27 are inserted between the ring 28 and the flange 29, and the ring 28 bears against a surface on the ring 30. The construction illustrated in Figs. 2 and 3 is to be preferred, however, as it possesses certain advantages over this second embodiment.

I claim:

1. In a stuffing box for propeller shafts, which operate in oil under pressure in the stern-tube, the combination of a member actuatable by the oil under pressure and adapted to be attached to the shaft and provided with a tightening flange, means for causing said member to rotate with the shaft and allowing the member to slide on the shaft in the longitudinal direction of the same, a packing between said member and the shaft, a stationary member surrounding said rotary member and provided with a tightening flange arranged to engage the flange of the rotary member and to receive the thrust of said member due to the oil pressure on the same, and means between said rotary member and said stationary member for pressing the said flange of said rotary member against the said flange of said stationary member in the direction of pressure of the oil in the stern-tube for compensating the resistance to the longitudinal movement of said rotary member on the shaft due to friction of said packing, substantially as described.

2. In a stuffing box for propeller shafts which are running in oil under pressure in the stern-tube, the combination of a member actuatable by the oil under pressure and adapted to be attached to the shaft and provided with a tightening flange, means for causing said member to rotate with the shaft and allowing the member to slide on the shaft in the longitudinal direction of the same, a packing between said member and said shaft, a stationary member surrounding said rotary member and provided with a tightening flange arranged to engage the flange of the rotary member and to receive the thrust of said member due to the oil pressure on the same, and means between said rotary member and said stationary member for pressing the said flange of said rotary member against the said flange of said stationary member in the direction of pressure of the oil in the stern-tube for compensating the resistance to the longitudinal movement of said rotary member on the shaft due to friction of said packing, said means being located and arranged in such manner as to give free access for the oil in the stern-tube to press on said rotary member as well as free passage for the oil to the bearing surface between said rotary flange and said stationary flange, substantially as described.

3. In a stuffing box for propeller shafts running in oil under pressure, a member secured to said shaft and rotating therewith, a flanged sleeve slidable on said shaft and operatively attached to said member to rotate therewith, a stationary flange and a stationary ring, said flange of said sleeve being located therebetween, and means to maintain said flanges and ring in closed contact.

4. In a stuffing box for a propeller shaft running in oil under pressure, a member secured to said shaft and rotating therewith, a flanged sleeve slidable on said shaft, said sleeve and member being provided, one with pins and the other with sockets, said pins loosely fitting said sockets to permit relative sliding of one member relative to the other, a stationary flange, a stationary ring, said flange of said sleeve being located therebetween, and means to maintain said flanges and ring in closed contact.

CARL WILHELM CEDERVALL.